United States Patent
Chaylard

(10) Patent No.: US 6,994,138 B2
(45) Date of Patent: Feb. 7, 2006

(54) TIRE FOR TWO-WHEELED VEHICLE

(75) Inventor: Yann Chaylard, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/978,414

(22) Filed: Nov. 2, 2004

(65) Prior Publication Data

US 2005/0061413 A1 Mar. 24, 2005

Related U.S. Application Data

(63) Continuation of application No. PCT/EP03/04873, filed on May 9, 2003.

(30) Foreign Application Priority Data

May 10, 2002 (FR) .............................. 02 05820

(51) Int. Cl.
B60C 9/22 (2006.01)
B60C 3/04 (2006.01)

(52) U.S. Cl. .................... 152/531; 152/454; 152/533
(58) Field of Classification Search ................ 152/531, 152/533, 454
See application file for complete search history.

(56) References Cited

U.S. PATENT DOCUMENTS

| 5,301,730 A | 4/1994 | Delias | |
|---|---|---|---|
| 5,975,175 A | 11/1999 | Armellin | |
| 6,276,415 B1 * | 8/2001 | Nakamura | 152/531 X |

FOREIGN PATENT DOCUMENTS

| EP | 0 456 933 | 11/1991 |
|---|---|---|
| EP | 0 565 339 | 10/1993 |
| EP | 0 928 707 | 7/1999 |
| EP | 0 756 949 | 11/2001 |
| FR | 2 651 588 | 3/1991 |
| JP | 05-319019 | 12/1993 |
| WO | WO 98/02320 | 1/1998 |

* cited by examiner

Primary Examiner—Adrienne C. Johnstone
(74) Attorney, Agent, or Firm—Burns, Doane, Swecker & Mathis, LLP

(57) ABSTRACT

The invention relates to a tire for a two-wheeled motorized vehicle and more particularly a motorcycle.

Such a tire comprises at least one carcass-type reinforcement structure, formed of reinforcement elements forming with the circumferential direction an angle of between 65° and 90°, anchored on either side of the tire to a bead whose base is intended to be fitted on a rim seat, each bead being extended radially towards the outside by a sidewall, the sidewalls meeting up, radially towards the outside, with a tread whose Ht/Wt ratio is greater than 0.15, said carcass reinforcement being radially surmounted at least in the zone of the tread by a crown reinforcement formed of at least one layer of circumferential reinforcement elements. According to the invention, said circumferential reinforcement elements are distributed in the transverse direction with a variable pitch such that said pitch is smaller at the centre (crown) of the tread than at the edges of said layer and such that the value of the pitch in the transverse direction follows an increasing mathematical progression over at least part of the axial width of said layer.

12 Claims, 2 Drawing Sheets

TIRE FOR TWO-WHEELED VEHICLE

The present application is a continuation of International Application PCT/EP03/04873 filed on May 9, 2003, designating the United States, and which publisher under WO 03/095242 on Nov. 20, 2003.

The present invention relates to a tire intended to be fitted on a two-wheeled vehicle and more particularly a motorcycle.

As in the case of all other tires, we are witnessing the radialization of motorcycle tires, the architecture of such tires comprising a carcass reinforcement formed of one or two plies of reinforcement elements forming with the circumferential direction an angle which may be between 65° and 90°, said carcass reinforcement being radially surmounted by a crown reinforcement formed at least of generally textile reinforcement elements.

Numerous crown reinforcement architectures have been proposed, depending on whether the tire is intended to be fitted at the front of the motorcycle or at the rear. A first structure consists, for said crown reinforcement, in using solely circumferential cables, and said structure is more particularly used for the rear position. A second structure, directly inspired by structures commonly used in passenger-vehicle tires, has been used to improve wear resistance, and consists in using at least two crown plies of reinforcement elements which are parallel to each other within each ply but crossed from one ply to the next, forming acute angles with the circumferential direction, such tires being more particularly suitable for the front of motorcycles. Said two crown plies may be surmounted radially by at least one ply of circumferential elements, generally obtained by helical winding of a strip of at least one reinforcement element coated with rubber. Patent no. FR 2 561 588 thus describes such a crown reinforcement, having at least one ply whose reinforcement elements form with the circumferential direction an angle which may vary between 0° and 8°, the modulus of elasticity of such elements amounting to at least 6000 N/mm$^2$, and, disposed between the carcass reinforcement and the ply of circumferential elements, a shock-absorption layer formed mainly of two plies of elements crossed from one ply to the next forming between them angles of between 60° and 90°, said crossed plies being formed of textile reinforcement elements having a modulus of elasticity of at least 6000 N/mm$^2$.

Document EP 0 456 933, with a view to providing a motorcycle tire with excellent stability at high speed as well as excellent contact with the ground, teaches for example that a crown reinforcement should be made with at least two plies: a first ply, radially the closest to the carcass reinforcement, being composed of cables oriented at an angle of between 40° and 90° relative to the circumferential direction and the second ply, radially the closest to the tread, being composed of cables wound helically in the circumferential direction.

U.S. Pat. No. 5,301,730, with a view to enhancing the drive ability of a tire designed for the rear of a motorcycle, proposes a crown reinforcement composed, proceeding from the radial carcass reinforcement to the tread, of at least one ply of substantially circumferential elements and two plies of elements crossed from one ply to the next and forming with the circumferential direction an angle which may be between 35° and 55°, elements of aromatic polyamide being suitable for use as the ply of elements parallel to the circumferential direction and aliphatic polyamide being suitable for the plies of crossed elements.

European patent EP 565 339 also describes a motorcycle tire comprising a radial carcass surmounted by a crown reinforcement consisting of a ply whose reinforcement elements produced from organic fibers are wound helically so as to adopt a substantially circumferential direction. According to this document, which relates to tires intended for use at high speed, the number of reinforcement cords is less at the centre of the tread than at the level of the shoulders. According to this teaching, such a tire makes it possible to retain the shape of the tire at high speed in particular at the shoulders while permitting deformation at the centre of the tread to improve contact with the ground.

U.S. Pat. No. 5,975,175 describes tires of the same type as above, comprising metallic reinforcement elements.

It would appear that tires produced according to these various methods may have certain weaknesses. In fact, it would appear that these tires may exhibit shortcomings in appearance at the level of the shoulders or in the sidewalls as soon as the tire is brought to the utilization pressure or after travel in particular in the case of metallic circumferential reinforcement elements.

The object of the invention is to overcome such drawbacks in particular by improving the quality and in particular the appearance of motorcycle tires, without for all that destroying the other properties required for user satisfaction and more particularly fitness for use at high speed.

This object has been achieved according to the invention by a tire for a two-wheeled motorized vehicle comprising at least one carcass-type reinforcement structure, formed of reinforcement elements which form with the circumferential direction an angle of between 65° and 90° and anchored on either side of the tire to a bead whose base is intended to be fitted on a rim seat, each bead being extended radially towards the outside by a sidewall, the sidewalls meeting up, radially towards the outside, with a tread whose Ht/Wt ratio is greater than 0.15, said carcass reinforcement being radially surmounted at least in the zone of the tread by a crown reinforcement formed of at least one layer of circumferential reinforcement elements, said circumferential reinforcement elements being distributed in the transverse direction with a variable pitch such that said pitch is smaller at the centre (crown) of the tread than at the edges of said layer and such that the value of the pitch in the transverse direction follows an increasing mathematical progression over at least part of the axial width of said layer.

According to a preferred embodiment of the invention, the edges of the layer of circumferential reinforcement elements extend as far as the shoulders or edges of the tire.

The centre or crown of the tread is defined by the equatorial plane of the tire.

The circumferential direction of the tire, or longitudinal direction, is the direction corresponding to the periphery of the tire and defined by the rolling direction of the tire.

The transverse or axial direction of the tire is parallel to the axis of rotation of the tire.

The reinforcement elements are reinforcement cords made of any material known to the person skilled in the art and which may have undergone any type of treatment, such as surface or coating or pre-sizing treatments to improve their adhesion to the rubber. The cords may be monofilaments, multifilaments, or assemblies such as cables, plied yarn or any other type of assembly known to the person skilled in the art.

According to a preferred embodiment of the invention, the value of the pitch in the transverse direction follows a progression over at least part of the axial width of said layer up to the edges of said layer. According to such an embodiment, the pitch between the circumferential reinforcement elements of said layer is advantageously constant in a zone covering the crown of the tread.

According to a first embodiment, the value of the pitch follows an arithmetic progression of the type $U(n)=U_0+nr$, with $U_0$ being between 0.4 mm and 2.5 mm and r being the difference of consecutive terms of the progression, said difference being between 0.001 and 0.1.

According to a second embodiment, the value of the pitch follows a geometric progression of the type $U(n)=U_0 \times r^n$, with $U_0$ being between 0.4 mm and 2.5 mm and r being the difference of consecutive terms of the progression, said difference being between 1.001 and 1.025.

According to other embodiments of the invention, the value of the pitch may be a combination of several progressions as a function of the axial position on said layer, said pitch being smaller at the centre of the tread than at the edges of said layer.

The variation in pitch between the circumferential reinforcement elements results in a variation in the number of circumferential reinforcement elements per unit length in the transverse direction and consequently in a variation in the density of circumferential reinforcement elements in the transverse direction and therefore in a variation in the circumferential rigidity in the transverse direction.

According to variant embodiments of the invention, the variation in pitch between the circumferential reinforcement elements may be combined with a variation in the diameter of the reinforcement elements, or with variation in the transverse direction of mechanical properties of the reinforcement elements and in particular with variation of the modulus of elasticity of the reinforcement elements. These variations in mechanical properties may be achieved, for example, by setting in place reinforcement elements which have undergone different treatments, reinforcement elements whose nature or constituent material is different, or alternatively reinforcement elements whose torsion varies in the transverse direction.

The tire according to the invention is thus produced contrary to the teaching of the above-mentioned known methods, by increasing for example the density of reinforcement elements at the crown of the tread relative to the edges, and imparts properties which are wholly satisfactory to the user, the tire furthermore exhibiting no shortcomings in appearance such as those of the tires listed above.

The applicant has succeeded in demonstrating that, during inflation to utilization pressure or subsequently during use of the tires, the reinforcement elements situated at the level of the shoulders may be subject to compression stresses. In the case of metallic reinforcement elements, these compression stresses explain the deformation phenomena which may be observed at the level of the shoulders or of the sidewalls of the tires of the prior art and which, according to these explanations, are the result of buckling of said metallic elements. Where the reinforcement elements are of organic material, it is also desirable to avoid such compression of these elements, since they are sensitive to such compression stresses.

Furthermore, the tests performed by the applicant show that the desired performance levels for use at high speed are achieved similarly to those of the tires described above.

The variation in pitch according to an arithmetic progression or according to a geometric progression, in particular in the zones reaching as far as the edges of the layer of circumferential reinforcement elements, in particular allows an improvement in the progressiveness between the straight line position and the position when cornering, that is to say when on a camber. This improves driving feel. Such a variation likewise improves comfort, in particular when cornering.

Furthermore, the local reduction in circumferential rigidity achieved in particular by a local reduction in the density of reinforcement elements by reducing the number of said reinforcement elements, in particular at the level of the shoulders, allows gains to be made in terms of manufacturing costs; it is possible, in fact, to make gains for example on the one hand in terms of quantity of material used and on the other hand in terms of productivity, since the time taken to position said reinforcement elements is proportional to their quantity.

According to one variant embodiment of the invention, the circumferential reinforcement elements are metallic elements. It appears, as explained above, that the tires produced according to the invention comprising such metallic elements exhibit the advantage of not exhibiting local deformation at the level of the shoulders or of the sidewalls, in particular when being brought to utilization pressure. It seems in fact that the reduction in the circumferential rigidity of the layer of circumferential reinforcement elements allows a reduction in or even elimination of the compression stresses endured by said reinforcement elements.

Furthermore, it is clear from the studies that the tires according to said variant embodiment of the invention maintain sufficient resistance in these same zones to withstand the over- or underpressures resulting in tension stresses in these same elements.

According to another variant embodiment of the invention, the circumferential reinforcement elements are organic elements, such as aramid elements. As explained in the case of metallic elements, the tires according to the invention allow the circumferential reinforcement elements situated at the level of the shoulders to withstand smaller or even non-existent compression stresses, while providing sufficient reinforcement for possible extension stresses.

According to another variant embodiment of the invention, the circumferential reinforcement elements are mineral elements, such as glass elements.

According to other variant embodiments of the invention, the circumferential reinforcement elements are composite elements or hybrids consisting of metallic and/or mineral and/or organic materials.

According to one embodiment of the invention, the tire comprises a crown reinforcement consisting furthermore of at least one ply or layer comprising reinforcement elements parallel to one another and forming an angle of at least 15° with the longitudinal direction. Such a tire in particular imparts improved properties and more particularly stability at high speed.

According to a preferred embodiment of the invention, the crown reinforcement consists of at least two plies or layers comprising reinforcement elements parallel to one another and crossed from one ply or layer to the next. A tire produced in this way is particularly advantageous for use at high speed.

According to one or other of these embodiments, the relative position between the layer comprising the circumferential reinforcement elements and the ply/plies or layer/layers comprising reinforcement elements parallel to one another and crossed from one ply or layer to the next may be defined as a function of the properties sought; the ply or layer of circumferential reinforcement elements may be positioned either under this or these plies, or on this or these plies, or indeed between two of these plies when the crown reinforcement comprises at least two of these plies.

Other advantageous details and features of the invention will become clear below from the description of examples of embodiment of the invention made with reference to FIGS. 1 to 3, in which.

To simplify understanding thereof, the Figures are not to scale.

Figure 1:
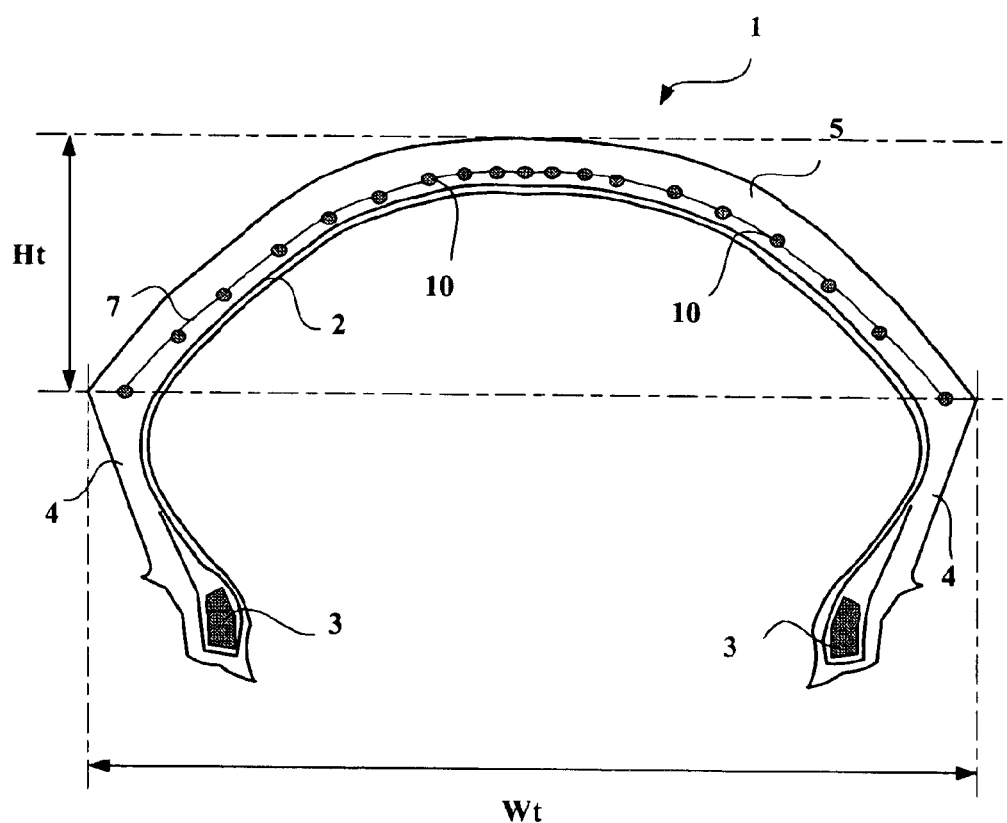
FIG. 1 is a meridian view of a diagram of a tire according to the invention.

FIG. 1 shows a tire 1 of dimension 180/55zr17. This tire 1 comprises a carcass reinforcement consisting of a single ply 2 comprising reinforcement elements of the textile type. The ply 2 consists of reinforcement elements disposed radially. The radial positioning of the reinforcement elements is defined by the laying angle of said reinforcement elements; a radial arrangement corresponds to a laying angle of said elements relative to the longitudinal direction of the tire of between 65° and 90°. Said ply 2 is anchored on either side of the tire 1 in a bead 3 whose base is intended to be fitted on a rim seat. Each bead 3 is extended radially towards the outside by a sidewall 4, said sidewall 4 meeting up radially towards the outside with the tread 5. The tire 1 thus constituted has a value of curvature greater than 0.15 and preferably greater than 0.3. The value of curvature is defined by the Ht/Wt ratio, that is to say by the ratio of the height of the tread to the maximum width of the tread of the tire. The value of curvature will advantageously be between 0.3 and 0.5 for a tire intended to be fitted at the front of a motorcycle and it will advantageously be between 0.2 and 0.5 for a tire intended to be fitted at the rear.

Between the carcass and the tread there is positioned a crown reinforcement consisting of at least one layer 7 comprising reinforcement elements 10 oriented in the circumferential or longitudinal direction and thus forming an angle with this longitudinal direction of 0° or close to 0°. This layer extends over at least part of the zone corresponding to the tread and advantageously over the entire surface corresponding to the tread. According to the invention, the pitch between the circumferential reinforcement elements varies over part of the layer of circumferential reinforcement elements in the transverse or axial direction in accordance with the invention such that said pitch is smaller at the crown of the tire than at the edge of the layer of circumferential reinforcement elements. According to this embodiment, the pitch is constant from the crown over an axial width of 60 mm in the direction of each of the edges of the tread and is equal to 0.85 mm, then varies according to an arithmetic progression, with Uo equal to 0.85 mm and a difference of consecutive terms equal to 0.025, over an axial width extending as far as 110 mm from the crown of the tire.

The circumferential reinforcement elements exhibit a modulus of elasticity preferably greater than 6000 N/mm². The circumferential elements are for example metallic or of aramid or glass.

The metallic reinforcement elements used are reinforcements of non-hoop-wrapped steel of type 4.23 with a diameter of 0.55 mm. In the case of reinforcement elements of aramid, elements of type 167x2-350/350 are used, for example.

They are set in place with a laying pitch which varies in the axial direction of the tire.

Figure 2:
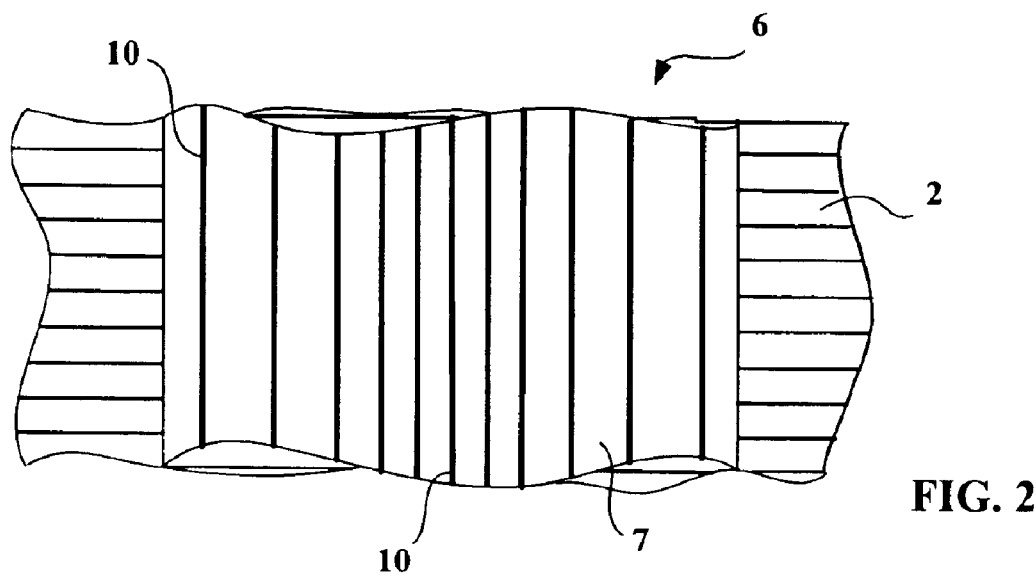
FIG. 2 is a diagrammatic representation of a stack of reinforcement elements according to a first embodiment of the invention.

FIG. 2 shows the case of a crown reinforcement 6 corresponding to the instance shown in FIG. 1 and comprising only one layer 7 of circumferential reinforcement elements 10. According to an advantageous embodiment of the invention, the reinforcement elements consist of a unitary cord. Such a tire is more particularly intended to be fitted on the rear wheel of a motorcycle.

Figure 3:
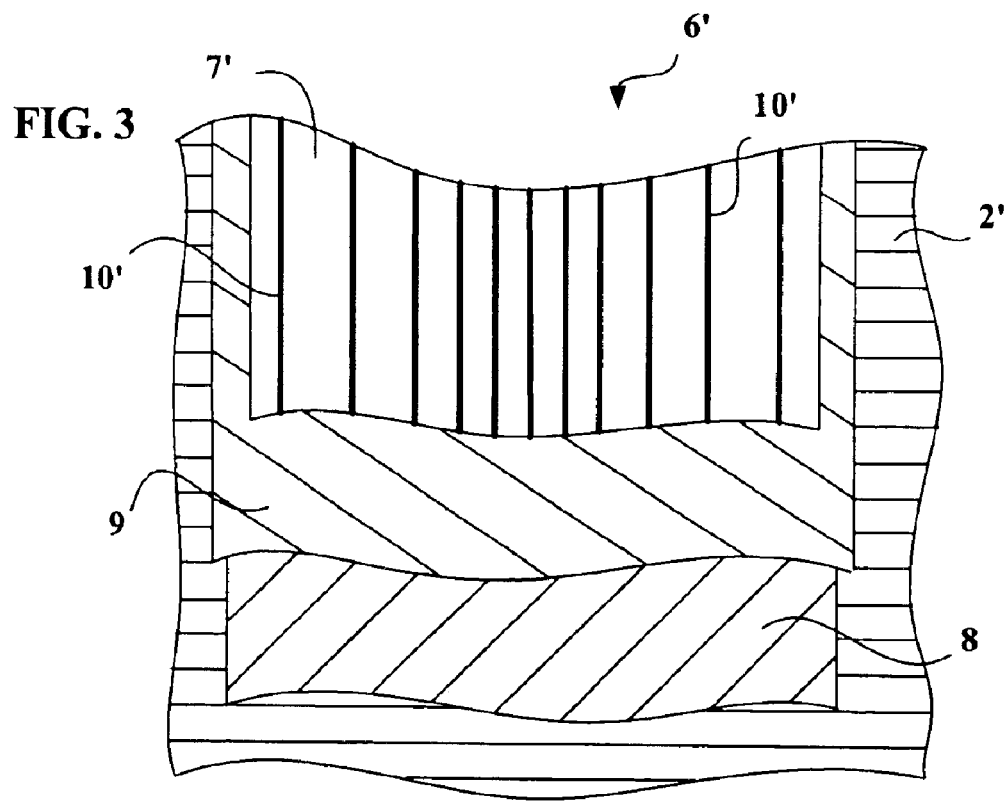
FIG. 3 is a diagrammatic representation of a stack of reinforcement elements according to a second embodiment of the invention.

FIG. 3 illustrates the case of a crown reinforcement 6' consisting of three plies or layers of reinforcement elements; moving radially outwards, the carcass ply 2' is covered with two working crown plies 8, 9 consisting of reinforcement elements parallel to one another and crossed from one ply to the other. The working crown plies are covered radially with a layer 7' comprising the circumferential reinforcement elements 10'. The arrangement and putting in place of these circumferential reinforcement elements 10' may be identical to the case illustrated in FIG. 2. A tire such as that of FIG. 3 may be fitted to the front and/or rear wheels of a motorcycle.

According to one or other of these embodiments of a tire according to the invention, the layer comprising the circumferential reinforcement elements is produced according to the invention in such a way that said reinforcement elements are distributed in the transverse direction with a variable pitch, such that the density of elements at the centre or crown of the tread is greater than at the edges of said layer of circumferential reinforcement elements. According to these embodiments, a variation is thus achieved in the circumferential rigidity in the transverse direction of the layer of circumferential reinforcement elements in such a way that the circumferential rigidity of said layer at the centre or crown of the tread is greater than at the edges of said layer.

This circumferential reinforcement layer according to the invention makes it possible to produce tires whose quality and in particular appearance is improved relative to the conventional tires described above. These tires furthermore allow the properties desired in particular for use at high speed to be retained.

What is claimed is:

1. A tire for a two-wheeled motorized vehicle comprising at least one carcass-type reinforcement structure, formed of reinforcement elements forming with the circumferential direction an angle of between 65° and 90°, anchored on either side of the tire to a bead whose base is intended to be fitted on a rim seat, each bead being extended radially towards the outside by a sidewall, the sidewalls meeting up, radially towards the outside, with a tread whose Ht/Wt ratio is greater than 0.15, said carcass reinforcement being radially surmounted at least in the zone of the tread by a crown reinforcement formed of at least one layer of circumferential reinforcement elements, wherein said circumferential reinforcement elements are distributed in the transverse direction with a variable pitch, wherein said pitch is smaller at the centre (crown) of the tread than at the edges of said layer and wherein the value of the pitch in the transverse direction follows an increasing mathematical progression over at least part of the axial width of said layer.

2. A tire for a two-wheeled motorized vehicle according to claim 1, wherein the layer of circumferential reinforcement elements extends as far as the shoulders of the tire.

3. A tire for a two-wheeled motorized vehicle according to claim 1, wherein the value of the pitch follows an arithmetic progression of the type U(n)=Uo+nr, with Uo being between 0.4 mm and 2.5 mm and r being the difference of consecutive terms of the progression, said difference being between 0.001 and 0.1.

4. A tire for a two-wheeled motorized vehicle according to claim 1, wherein the value of the pitch follows a geometric progression of the type U(n)=Uo×$r^n$, with Uo being between 0.4 mm and 2.5 mm and r being the difference of consecutive terms of the progression, said difference being between 1.001 and 1.025.

5. A tire for a two-wheeled motorized vehicle according to claim 1, wherein the diameter of the reinforcement elements varies in the transverse direction.

6. A tire for a two-wheeled motorized vehicle according to claim 1, wherein the mechanical properties of the reinforcement elements vary in the transverse direction.

7. A tire for a two-wheeled motorized vehicle according to claim 1, wherein the circumferential reinforcement elements exhibit a modulus of elasticity greater than 6000 N/mm$^2$.

8. A tire for a two-wheeled motorized vehicle according to claim 1, wherein the circumferential reinforcement elements are of steel.

9. A tire for a two-wheeled motorized vehicle according to claim 1, wherein the circumferential reinforcement elements are of aramid.

10. A tire for a two-wheeled motorized vehicle according to claim 1, wherein the circumferential reinforcement elements are of glass.

11. A tire for a two-wheeled motorized vehicle according to claims 1, wherein the crown reinforcement comprises at least one ply or layer comprising reinforcement elements parallel to one another and forming an angle of at least 15° with the longitudinal direction.

12. A tire for a two-wheeled motorized vehicle according to claim 11, wherein the crown reinforcement comprises at least two plies or layers comprising reinforcement elements parallel to one another and crossed from one ply or layer to the next.

* * * * *